Sept. 14, 1926.
R. A. WALSH
1,600,082
COMBINED MILK BOTTLE STOPPER AND POURING SPOUT
Filed Nov. 4, 1925
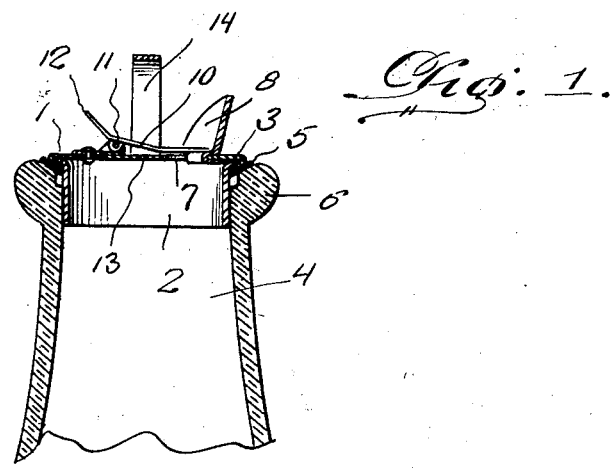
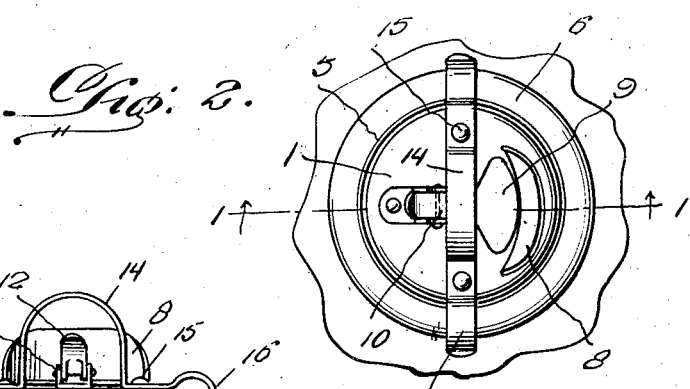
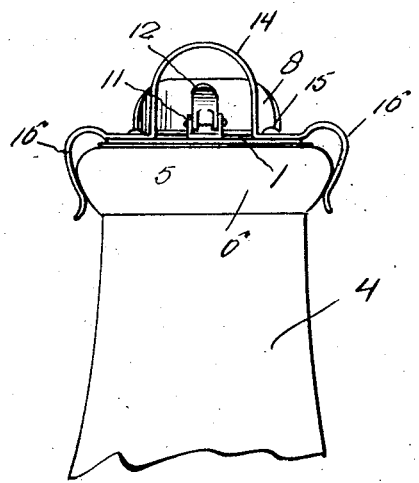
Inventor
R. A. Walsh
By Clarence A. O'Brien
Attorney Patented Sept. 14, 1926.

1,600,082

UNITED STATES PATENT OFFICE.

RICHARD A. WALSH, OF DAYTON, OHIO.

COMBINED MILK-BOTTLE STOPPER AND POURING SPOUT.

Application filed November 4, 1925. Serial No. 66,761.

This invention relates to improvements in milk bottle stoppers, and is more particularly adapted to an improvement over the device embodied in my copending application bearing Serial No. 739845, filed September 25, 1924, and allowed July 23, 1925.

One of the important objects of the present invention is to provide a device which includes a means for detachably supporting the combined milk bottle stopper and pouring spout on a milk bottle, said means comprising spring gripping fingers which are secured on the stopper and are further adapted to engage over the usual bead formed on the upper portion of the neck of a milk bottle.

A further object is to provide a device of the above mentioned character, wherein the handle provided for the stopper has the spring clips forming a part thereof, the handle being associated with the stopper in such a manner as to enable the same to be readily and easily grasped for inserting or removing the stopper from the neck of the bottle.

A still further object is to provide a device of the above mentioned character which is simple in construction, inexpensive, strong, and durable and further well adapted to the purpose for which it is designed.

Other objects and advantages of the invention will become apparent from the following description taken in connection with the accompanying drawing.

In the accompanying drawing forming a part of the application and in which like numerals designate like parts throughout the same:

Figure 1 is a sectional view taken approximately on line 1—1 of Figure 2 showing the pivoted closure for the outlet opening in side elevation.

Figure 2 is a top plan view of my improved milk bottle stopper and pouring spout, and Figure 3 is a side elevation showing the same about to be attached to a milk bottle.

In the drawing wherein for the purpose of illustration is shown the preferred embodiment of my invention, the numeral 1 designates a metallic disc, the outer edge thereof being flanged inwardly on the under side of the disc for cooperation with the outwardly flared upper edge of the tubular member 2 in the manner illustrated generally at 3, with reference more particularly to Figure 1. In this manner, the tubular member 2 will be carried by the disc 1. The tubular member is of such construction as to permit the same to fit snugly within the neck 4 of a milk bottle. A rubber packing ring or washer 5 encircles the tubular member and is interposed between the flared portion of the tubular member and the inner upper portion of the annular bead 6 which is formed on the upper portion of the neck 4 of the milk bottle. The purpose of the rubber packing ring or washer will prevent the contents of the bottle from leaking.

The disc 1 is provided with an outlet opening 7 and extending upwardly from the disc adjacent the opening is the pouring spout 8 whereby the milk may be poured from the bottle in an easy and efficient manner without spilling the same.

The outlet opening 7 is normally closed by means of the closure plate 9 which is formed on the forward end of a suitable lever 10 in the form of a flat strip of metal. This lever is pivotally supported on the upper face of the disc 1 at a point adjacent the rear end of the lever as indicated generally at 11. The rear end of the lever is disposed upwardly as indicated at 12 to provide a finger piece which is adapted to be moved downwardly so as to cause the plate-like closure 9 formed on the forward end of the lever 10 to be raised so as to uncover the outlet opening 7 should the cover become stuck. The provision of the closure plate 9, wherein the same is of such shape as shown in Figure 2 will cause the same to normally be disposed over the outlet opening and thereby provide what may be termed as a weighted closure.

It is of course understood that when the milk bottle is tilted to a pouring position, the closure plate 9 will be automatically moved out of engagement with the outlet opening 7 whereby the milk may be poured from the bottle out through the opening. In order to permit the milk to flow freely from the bottle when the latter is in tilted position, the disc is provided with a suitable opening 13 which provides an air vent.

My improved bottle stopper further includes a relatively long strip of spring metal which has its intermediate portion bent or curved in such a manner as to provide a bail or handle portion 14. The end or free portions of the strip of spring metal are disposed laterally in opposite directions and the laterally extending portions of the strip are secured on the upper face of the disc 1 as indicated at 15. Each of the free ends of the flat strip of spring metal is curved inwardly to provide the diametrically opposed spring clips or gripping members 16, the construction of which is clearly illustrated in Figure 3 of the drawing.

The spring clip or gripping members are adapted to be sprung over the annular bead 6 formed on the upper end of the neck 4 of the milk bottle, and when the disc and the tubular member 2 carried thereby are properly disposed within the upper portion of the neck of the milk bottle, the opposed spring clips will engage the annular bead, it being understood of course that the spring clips are of such construction as to conform to the cross sectional shape or configuration of the annular bead and when the parts are so arranged, the stopper will be held on the milk bottle against accidental displacement therefrom. The bail or handle 14 extends upwardly from the central portion of the disc, and may be readily and easily grasped for facilitating the attaching of the stopper on a milk bottle and will further permit the same to be readily removed therefrom.

The simplicity in which the handle and spring clips are constructed enables the same to be readily attached on the disc of the milk bottle stopper and the complete device will be manufactured at a very low cost and will at all times be positive and efficient in carrying out the purposes for which it is designed.

While I have shown the preferred embodiment of my invention, it is to be understood that minor changes coming within the spirit of the invention and the scope of the appended claims may be made.

Having thus described the invention, what I claim as new is:—

1. A device of the class described comprising a disc, adapted to fit snugly in the upper end of the neck of a milk bottle, a handle for the disc formed from a single strip of spring metal, the handle being in the form of a bail, the free ends thereof being disposed laterally and secured on the upper face of the disc, said laterally extending portions of the bail terminating in diametrically opposed spring clips adapted for detachable engagement with the annular bead formed on the upper end of the neck of the milk bottle.

2. A device of the class described comprising a disc, a tubular member adapted to fit snugly in the upper portion of the neck of a milk bottle, the upper edge portion of said tubular member being flared outwardly, the edge of said disc being flanged inwardly and engaging the under face of the outwardly flared portion of the tubular member, whereby the disc and the tubular member are secured together, a packing ring encircling the tubular member and adapted to fit against the under side of the inwardly flanged portion of said disc, said disc having an outlet opening therein, a pouring spout surrounding said opening, and a pivoted closure for the opening.

In testimony whereof I affix my signature.

RICHARD A. WALSH.